(12) United States Patent
Johari et al.

(10) Patent No.: US 6,449,676 B1
(45) Date of Patent: Sep. 10, 2002

(54) HOT-PLUGGABLE VOLTAGE REGULATOR MODULE

(75) Inventors: Girish Chandra Johari; Mark Wayne Mueller; Peter Matthew Thomsen; Lucinda Mae Walter, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,081

(22) Filed: Mar. 30, 1999

(51) Int. Cl.[7] .......................... G06F 13/00; G06F 1/26; H02H 7/00
(52) U.S. Cl. ..................... 710/304; 710/302; 713/300; 361/18
(58) Field of Search ................................. 710/101, 102, 710/103, 104, 100, 301, 302, 304; 361/5, 6, 7, 18, 21, 64, 65; 713/300

(56) References Cited

U.S. PATENT DOCUMENTS

| | | | |
|---|---|---|---|
| 5,572,141 A | * 11/1996 | Hutton | ........................ 327/757 |
| 5,712,754 A | 1/1998 | Sides | |
| 6,035,358 A | 3/2000 | Tanikawai | |
| 6,038,633 A | * 3/2000 | Tavallaei | ..................... 710/262 |
| 6,041,375 A | 3/2000 | Bass et al. | |
| 6,044,424 A | 3/2000 | Amin | |
| 6,108,732 A | 8/2000 | Klein | |
| 6,182,173 B1 | 1/2001 | Grosser et al. | |
| 6,191,499 B1 | * 2/2001 | Severson et al. | .............. 307/31 |
| 6,209,051 B1 | 3/2001 | Hill | |
| 6,275,958 B1 | * 8/2001 | Carpenter et al. | ............. 714/48 |
| 6,282,596 B1 | 8/2001 | Bealkowski et al. | |
| 6,286,066 B1 | * 9/2001 | Hayes et al. | ................. 710/302 |
| 6,289,467 B1 | 9/2001 | Lewis et al. | |

OTHER PUBLICATIONS

U.S. patent Ser. No. 09/281,082, Johari et al., filed Mar. 30, 1999.

* cited by examiner

*Primary Examiner*—Peter Wong
*Assistant Examiner*—Tim Vo
(74) *Attorney, Agent, or Firm*—Andrew J. Dillon

(57) ABSTRACT

A power subsystem for a computer system allows a voltage regulator module (VRM) to be removably connected to a system board, while limiting disturbances on the voltage rails of the system board. The electrical disturbances are prevented by charging voltage outputs of the DC/DC circuit of the VRM prior to directly connecting the voltage outputs to the voltage rails. To ensure that the voltage outputs are properly charged, a VRM connector may be used in which the voltage output pins are shorter than charge pins which are coupled to respective capacitors and to the voltage outputs of the DC/DC circuit. In this manner, as the connector is mated with a corresponding connector on the system board, the capacitors are first charged via resistive paths connected to the voltage rails, prior to directly connecting the voltage outputs to the voltage rails. The VRMs are thus "hot-pluggable," enabling a user to upgrade or service the system with no interruption.

18 Claims, 1 Drawing Sheet

HOT-PLUGGABLE VOLTAGE REGULATOR MODULE

BACKGROUND OF THE INVENTION

1. Field of the Invention

The present invention generally relates to computer systems, particularly to a method of upgrading or servicing computer components, and more specifically to a method of exchanging (swapping out) voltage regulator modules for a computer system, without powering down the computer system or otherwise interrupting service.

2. Description of Related Art

Modern computing systems are often constructed from a number of processing units and a main memory, connected by a generalized interconnect. The basic structure of a conventional multi-processor computer system 10 is shown in FIG. 1. Computer system 10 has several processing units (CPUs) 12a, 12b, and 12c which are connected to various peripheral, or input/output (I/O) devices 14 (such as a display monitor, keyboard, and permanent storage device), memory device 16 (random-access memory or RAM) that is used by the processing units to carry out program instructions, and firmware 18 whose primary purpose is to seek out and load an operating system from one of the peripherals (usually the permanent memory device) whenever the computer is first turned on.

Processing units 12a–12c communicate with the peripheral devices, memory and firmware by various means, including a bus 20. Computer system 10 may have many additional components which are not shown, such as serial and parallel ports for connection to, e.g., modems or printers. Those skilled in the art will further appreciate that there are other components that might be used in with those shown in the block diagram of FIG. 1; for example, a display adapter might be used to control a video-display monitor, a memory controller can be used to access memory 16, etc. The computer can also have more than three processing units. In a symmetric multi-processor (SMP) computer, all of the processing units 12a–12c are generally identical, that is, they all use a common set or subset of instructions and protocols to operate, and generally have the same architecture.

Conventional computer systems often allow the user to add various components after delivery from the factory. For peripheral devices, this can be accomplished using an "expansion" bus, such as the Industry Standard Architecture (ISA) bus or the Peripheral Component Interconnect (PCI) bus. Another component that is commonly added by the user is main memory. This memory is often made up of a plurality of memory modules that can be added or removed as desired. Even processing units can be added or swapped out, in more recent computer designs.

One item that heretofore has not been user-serviceable is the voltage regulator module that is used for the various computer components. These components require different power sources/references at precise voltages, and the voltage regulator module (VRM) produces these voltages. A VRM is connected to the main power supply for the computer (e.g., a 110 volt AC wall outlet), and uses transformers and solid-state circuitry to generate smooth reference signals which are essentially invariant over a reasonable range of operating parameters (e.g., temperature).

If a VRM is defective and the computer system is powered-up, the system will simply not pass the power-on test (POST), and will halt operation. However, if a system is running and the VRM becomes defective, it can wreak havoc on the system. In order to replace a defective VRM, it is necessary to power down the computer system, since VRMs are integrated (hard-wired) into the system hardware. A field service engineer often must be called to perform the maintenance.

For many computer systems (particularly large servers used in a client-server network), there may be hundreds of users connected to it, and the down time required to perform a VRM service operation can be extremely expensive. Also, in systems which are used in mission-critical applications, it is highly desirable to be able to perform a VRM service operation without service interruption, particularly when it is necessary to replace a defective VRM.

Some computer components, such as "hot-pluggable" PCI adapters, are currently available that can be added or removed from a computer system while the system is fully operational. Each PCI adapter slot has a separate power line, a separate reset line, and a switch connecting the slot to the PCI bus, allowing the slot to be electrically isolated from the PCI bus, and reactivated after insertion of a new PCI device into the slot. This hot-plug capability has never been expanded to VRMs.

A user may not only want to service a defective VRM without service interruption, but may also desire to add more power capacity to an existing system (in order to supply new, added components), again without service interruption. It would, therefore, be desirable to provide a method of upgrading or servicing a system's voltage regulator module without requiring a powering down or interruption of the system. It would be further advantageous if the method did not require the expertise of a field service engineer to carry out the maintenance.

SUMMARY OF THE INVENTION

It is therefore one object of the present invention to provide an improved method of upgrading and servicing components of a computer system.

It is another object of the present invention to provide such a method that allows a voltage regulator module (VRM) of the computer system to be upgraded or serviced, without interrupting system operation.

It is yet another object of the present invention to provide such a method that does not require the VRM to be hard-wired to the system, so as to simplify any VRM maintenance.

The foregoing objects are achieved in a power subsystem for a computer system, generally comprising a circuit board having at least one voltage rail for supplying power to a component of the computer system, and means for connecting a plurality of voltage regulator modules (VRMs) to the voltage rail, while limiting disturbances on the voltage rail when a VRM is electrically connected thereto. The circuit board may be, e.g., a system board of the computer system having firmware mounted thereon. The disturbances on the voltage rail can be prevented by charging the voltage output of the VRM prior to directly connecting the voltage output to the voltage rail.

In an illustrative embodiment, each VRM has a DC/DC circuit and a VRM connector having a plurality of pins electrically connected to respective connections of the DC/DC circuit. The pins include at least one ground pin, and charge pins coupled to respective capacitors and to voltage outputs of the DC/DC circuit. A voltage input pin is connected to a voltage input of the DC/DC circuit, and voltage output pins are connected respectively to the voltage outputs of the DC/DC circuit. The voltage output pins are shorter than the charge pins and shorter than the ground pin such that, as the connector is mated with a corresponding connector on the system board, the capacitors are first charged via resistive paths connected to the voltage rails, prior to directly connecting the voltage outputs to the voltage rails. In the manner, the VRMs become "hot-pluggable," enabling a user to upgrade or service the system while it is still running, with little or practically no effect on service.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
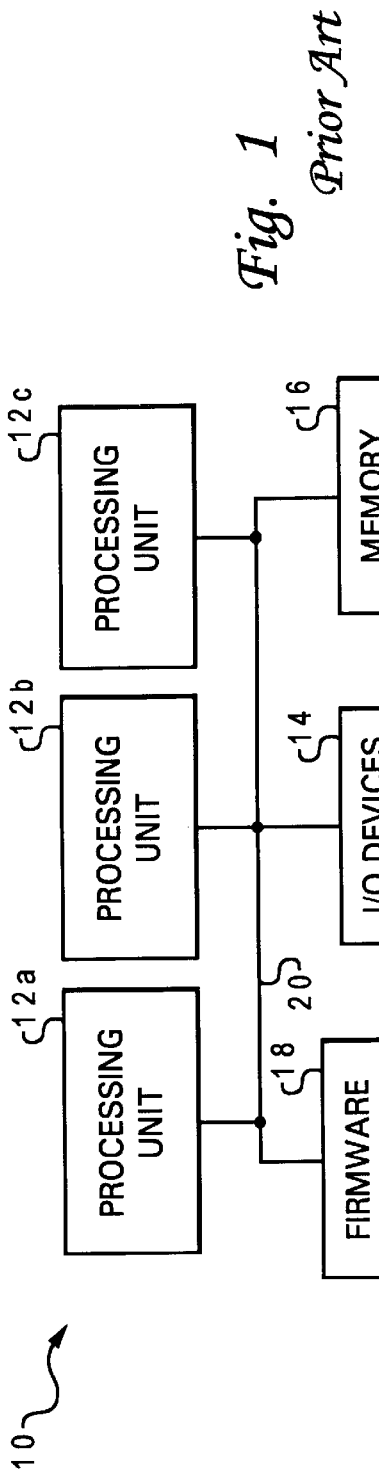
FIG. 1 is a block diagram of a prior-art multi-processor computer system.
Figure 2:
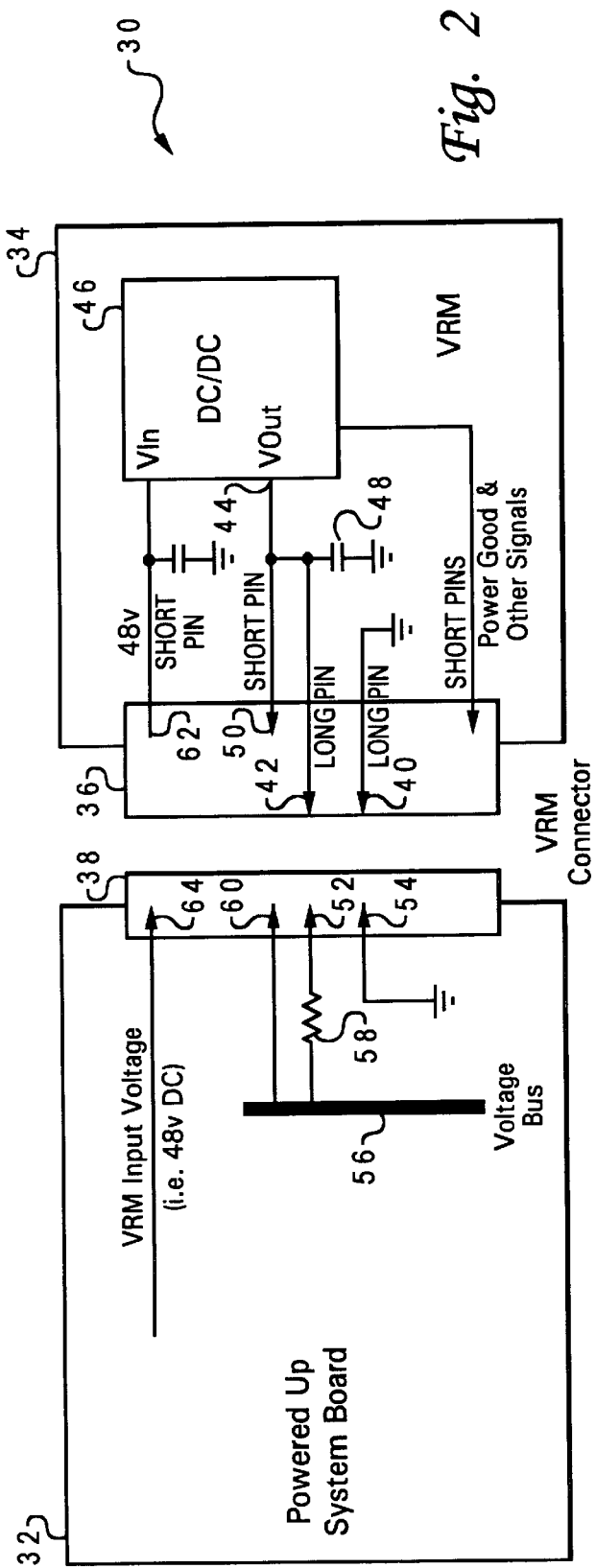
FIG. 2 is high level schematic diagram illustrating the interconnection of a removable voltage regulator module (VRM) and a system board in accordance with the present invention, allowing VRM upgrade or service without is interrupting the computer's operation.

With reference now to the figures, and in particular with reference to FIG. 2, there is depicted the interconnection of a removable voltage regulator module 30 (VRM) and a system board 32 of a computer system, in accordance with one embodiment of the present invention. VRM 30 is "hot-pluggable," that is, it can be added to or removed from system board 32 in such a manner as to allow uninterrupted service of the computer system. VRM 30 includes a plurality of leads and circuits formed on or mounted to a circuit board 34, and a VRM connector 36 adapted to interconnect VRM 30 to system board 32 via a corresponding connector 38. The system board is adapted to utilize several VRMs, as hereinafter explained. The ability to hot-plug a VRM may be desirable when, e.g., a particular VRM is identified as being defective.

VRM connector 36 has a plurality of metallic (electrically conductive) pins which mate with matching holes or sockets in system board connector 38. The pins extend from a side edge of circuit board 34, and are generally parallel. In the illustrative embodiment, the lengths of these pins are selected to control the output voltages generated by the VRM during the plugging or unplugging operation, and thereby limit or prevent disturbances on the voltage rails of the system. In the initial state, the computer system is powered-up, and a VRM installed in the system is generating the power required at the required voltages and currents. This original VRM is not illustrated in FIG. 2, but is preferably of the same general construction as VRM 30, including the connector used to allow the device to be removed from the system board. The VRM to be added (30) is completely unpowered prior to installation.

The pins on VRM connector 36 have two lengths (short and long) to allow different parts of the circuit to engage corresponding sockets in connector 38 at different times as the connectors are mated. The first pins to make contact with the powered-up system are the ground pin(s) 40, and charge pins that connect to the voltage rails of system board 32. In FIG. 2, only one charge pin 42 is depicted, but it is understood that one such charge pin is provided for each voltage rail on system board 32, i.e., for each output voltage 44 of the DC/DC circuit 46 of VRM 30. Each charge pin 42 is connected to a respective voltage output 44, and a respective capacitor 48. Each voltage output 44 is also connected to a respective short pin 50 of VRM connector 36.

As connector 36 is attached to connector 38, charge pin 42 makes contact with a corresponding socket 52 of connector 38, and ground pin 40 makes contact with a grounded socket 54 of connector 38, prior to short pin 50 completing any connection. Socket 52 is connected to a voltage rail 56 via a resistor 58. The voltage from voltage rail 56 charges up capacitor 48, prior to short pin 50 completing any connection. Thereafter, when short pin 50 contacts its corresponding socket 60, which is also connected to voltage rail 56, charged capacitor 48 on hot-plugged VRM 30 prevents the VRM from loading down the voltage rail of the system board until the VRM becomes operational. VRM 30 becomes operational once the (short) DC/DC voltage input pin 62 comes into contact with the VRM input voltage socket 64 of system board connector 38. If the original VRM is defective, it can then be removed (powered-down), and serviced.

The specific values for the various electrical components of the VRM may vary according to the application. In the illustrative embodiment, the VRM input voltage is 48 volts DC, and the voltage outputs of DC/DC circuit 46 provide voltages of 1.5 volts, 1.8 volts, ... and 3.3 volts. Appropriate values for the capacitance of capacitor 48 and the resistance of resistor 58, are 1000 $\mu$F and one $\Omega$, respectively. The VRM input voltage may be provided using the voltage supply described in U.S. patent application Ser. No. 09/281, 082, filed concurrently herewith, which is hereby incorporated.

While the foregoing embodiment uses short/long pins in VRM connector 36, and pins of a single size only in system board connector 38, those skilled in the art will appreciate that the converse arrangement could be provided. Also, other techniques (relays, solid state delay switches, etc.) could be used to ensure that the voltage output pin capacitors are charged through a resistive path prior to direct connection of the voltage outputs to the respective voltage rails.

By adding the benefits obtained from "hot-pluggability" to the VRMs in the system, the power subsystem gains new flexibility, reliability and serviceability. The present invention thus enables a user to upgrade or service the system while it is still running, with little or practically no effect on service. This feature is particularly useful in systems supporting mission critical applications, or systems with very large numbers of users, wherein a computer shutdown would have deleterious effects.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the foregoing description refers to VRMs being attached to the system board, which may be the board that supports the processors or firmware, but the invention could also be implemented by connecting VRMs to other circuit boards of the computer system which are further interconnected to the other computer components. It is therefore contemplated that such modifications can be made without departing from the spirit or scope of the present invention as defined in the appended claims.

What is claimed is:

1. A method of providing maintenance for a voltage regulator module (VRM) of a computer system without interrupting operation of the computer system, comprising the steps of:
   supplying power to the computer system using a first VRM removably attached to a system board of the computer system;
   electrically connecting a second VRM to the system board while limiting disturbances to a voltage supply on the system board comprising the steps of:
      charging at least one voltage output of the second VRM;
      electrically connecting the voltage output of the second VRM directly to a voltage rail of the system board, after said charging step;
      powering up the second VRM; and
   removing the first VRM from the system board, after said connecting step, while maintaining power to the computer system using the second VRM.

2. The method of claim 1 wherein said removing step includes the step of powering down the first VRM.

3. The method of claim 1 comprising the further step of identifying the first VRM as being defective.

4. The method of claim 1 comprising the further step of servicing the first VRM after said removing step.

5. The method of claim 1 comprising the further step of electrically connecting a third VRM to the system board while limiting disturbances to the voltage supply on the system board.

6. The method of claim 1 wherein:
   the second VRM is comprised of a circuit board, a DC/DC circuit mounted on the circuit board, and a connector attached to the circuit board, having a plurality of pins, the pins being electrically connected to respective leads of the circuit board, and the leads being electrically connected to respective connections of the DC/DC circuit, the pins including at least one ground pin, and at least one charge pin coupled to a capacitor and coupled to a lead which is connected to a voltage output connection of the DC/DC circuit; and
   said charging step is performed in response to the charge pin making contact with a corresponding socket on a connector of the system board, the socket being electrically connected to a voltage rail of the system board via a resistive path.

7. The method of claim 6 wherein:
   the plurality of pins further includes at least one voltage output pin connected to a lead of the circuit board which is connected to the voltage output of the second VRM; and
   said step of electrically connecting the voltage output of the second VRM includes the step of the voltage output pin making contact with a corresponding socket on a connector of the system board, the socket being electrically connected to a voltage rail of the system board.

8. The method of claim 6 wherein:
   the plurality of pins further includes at least one voltage input pin connected to a lead of the circuit board which is connected to a voltage input of the second VRM; and
   said powering up step includes the step of the voltage input pin making contact with a corresponding socket on a connector of the system board, the socket being electrically connected to a voltage input supply of the system board.

9. A power subsystem for a computer system, comprising:
   a circuit board having at least one voltage rail for supplying power to a component of the computer system; and
   means for removably connecting a plurality of voltage regulator modules (VRMs) to said voltage rail, said connecting means limiting disturbances on said voltage rail when a VRM is electrically connected thereto wherein, said connecting means limits the disturbances on said voltage rail by charging a voltage output of the VRM prior to directly connecting the voltage output of the VRM to said voltage rail.

10. The power subsystem of claim 9 wherein said circuit board is a system board of the computer system having firmware mounted thereon.

11. The power subsystem of claim 9 wherein said connecting means powers up the VRM after the voltage output has been charged.

12. The power subsystem of claim 9, further comprising a plurality of VRMs each having a VRM circuit board, a DC/DC circuit mounted on said VRM circuit board, and a VRM connector attached to said VRM circuit board, said VRM connector having a plurality of pins, said pins being electrically connected to respective leads of said circuit board, and said leads being electrically connected to respective connections of said DC/DC circuit, said pins including at least one ground pin, and at least one charge pin coupled to a capacitor and coupled to a lead which is connected to a voltage output of said DC/DC circuit.

13. The power subsystem of claim 12 wherein said plurality of pins further includes at least one voltage input pin connected to a lead of said VRM circuit board which is connected to a voltage input of said DC/DC circuit.

14. The power subsystem of claim 12 wherein said plurality of pins further includes at least one voltage output pin connected to a lead of said VRM circuit board which is connected to said voltage output of said DC/DC circuit.

15. The power subsystem of claim 14 wherein said voltage output pin is shorter than said charge pin and shorter than said ground pin.

16. A device comprising:
   a first circuit board having a plurality of voltage rails for supplying power to electrical components;
   a first connector mounted on said first circuit board, having a plurality of sockets electrically connected to said voltage rails, respectively, and at least one socket electrically connected to a ground of said first circuit board;
   a second circuit board supporting a DC/DC circuit having a plurality of voltage outputs;
   a second connector mounted on said second circuit board, having a plurality of pins electrically connected to said voltage outputs, respectively, and at least one pin electrically connected to a ground of said second circuit board, said second connector being adapted to removably mate with said first connector, said pins in said second connector being arranged to mate correspondingly with said sockets in said first connector; and
   means for limiting disturbances on said voltage rails as said first and second connectors are attached and connect said voltage rails to said voltage outputs.

17. The device of claim 16 wherein said limiting means includes:

a plurality of charge sockets located in said first connector, and connected, respectively, to said voltage rails via a plurality of resistive paths;

a plurality of charge pins located in said second connector, said charge pins being connected, respectively, to said voltage outputs, and being arranged to mate correspondingly with said charge sockets; and a plurality of capacitors respectively connected to said charge pins.

18. The device of claim 16 wherein:

said first circuit board further has a voltage supply;

said first connector further includes a voltage supply socket electrically connected to said voltage supply;

said DC/DC circuit further has a voltage input; and said second connector further includes a voltage input pin electrically connected to said voltage supply, and arranged to mate correspondingly with said voltage supply socket.

* * * * *